US008972509B2

(12) United States Patent
Maheshwari et al.

(10) Patent No.: US 8,972,509 B2
(45) Date of Patent: Mar. 3, 2015

(54) AUTOMATED RICH-CONTENT MESSAGING

(75) Inventors: Satya Deep Maheshwari, Noida (IN);
Rajesh Garg, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 210 days.

(21) Appl. No.: 13/559,738

(22) Filed: Jul. 27, 2012

(65) Prior Publication Data

US 2014/0032683 A1 Jan. 30, 2014

(51) Int. Cl.
*G06F 15/16* (2006.01)
*H04L 29/06* (2006.01)

(52) U.S. Cl.
CPC ...... *H04L 65/4023* (2013.01); *H04L 29/06408* (2013.01)
USPC ........... 709/206; 709/203; 709/204; 709/205; 709/223; 709/224

(58) Field of Classification Search
CPC ... H04L 63/0263; H04L 63/20; H04L 63/101; H04L 67/22; H04L 67/24; H04L 41/12; H04L 41/26; H04L 43/00; H04L 65/4023; H04L 29/06408; H04L 12/581
USPC ......... 709/206, 223, 224, 203, 204, 205, 207; 726/11, 23
See application file for complete search history.

(56) References Cited

U.S. PATENT DOCUMENTS

| | | | | |
|---|---|---|---|---|
| 6,473,407 B1* | 10/2002 | Ditmer et al. | ................ | 370/252 |
| 6,571,285 B1* | 5/2003 | Groath et al. | ................ | 709/223 |
| 7,249,179 B1* | 7/2007 | Romero et al. | ............... | 709/226 |
| 7,552,204 B2* | 6/2009 | Bobde et al. | .................. | 709/223 |
| 7,937,470 B2* | 5/2011 | Curley et al. | ................. | 709/226 |
| 7,975,045 B2* | 7/2011 | Underwood | ................. | 709/224 |
| 8,402,095 B2* | 3/2013 | Beauchamp et al. | ......... | 709/206 |
| 8,613,083 B1* | 12/2013 | Njemanze et al. | .............. | 726/22 |
| 8,677,489 B2* | 3/2014 | Strebe et al. | .................... | 726/23 |
| 2002/0156688 A1* | 10/2002 | Horn et al. | ...................... | 705/26 |
| 2002/0161875 A1* | 10/2002 | Raymond | ..................... | 709/223 |
| 2003/0217195 A1* | 11/2003 | Mandal et al. | ................ | 709/330 |
| 2004/0107125 A1* | 6/2004 | Guheen et al. | .................... | 705/7 |
| 2004/0181685 A1* | 9/2004 | Marwaha | ....................... | 713/201 |
| 2006/0037075 A1* | 2/2006 | Frattura et al. | .................. | 726/22 |
| 2006/0136309 A1* | 6/2006 | Horn et al. | ....................... | 705/26 |
| 2006/0149658 A1* | 7/2006 | Smith | .............................. | 705/37 |
| 2006/0173936 A1* | 8/2006 | Castro et al. | ................... | 707/205 |
| 2008/0195602 A1* | 8/2008 | Keller et al. | ........................ | 707/5 |
| 2008/0263188 A1* | 10/2008 | Awduche et al. | ............. | 709/223 |
| 2009/0037534 A1* | 2/2009 | Castro et al. | ................... | 709/205 |
| 2009/0216881 A1* | 8/2009 | Lovy et al. | ..................... | 709/224 |
| 2009/0300158 A1* | 12/2009 | Bobde et al. | .................. | 709/223 |
| 2010/0293055 A1* | 11/2010 | Nash | .......................... | 705/14.55 |
| 2013/0152187 A1* | 6/2013 | Strebe et al. | .................... | 726/11 |

* cited by examiner

*Primary Examiner* — Thu Ha Nguyen
(74) *Attorney, Agent, or Firm* — Shook Hardy & Bacon LLP

(57) ABSTRACT

Various embodiments include systems, methods, and software for automated rich-content messaging. Some such embodiments generating messages to be sent via email, MMS, social media, or other electronic mechanisms from a business application based on message templates authored within a content management program. Messages may be generated and sent based on event occurrences, monitored data conditions, and the like.

20 Claims, 6 Drawing Sheets

AUTOMATED RICH-CONTENT MESSAGING

BACKGROUND INFORMATION

Recipients of electronic messages, such as email, are typically more responsive to messages that include rich content such as images, hyperlinks, well-formatted text, and calendar invites. Organizations that send electronic messages to recipients often generate electronic messages based on standardized and organizationally approved message templates that are created and maintained through use of content management tools. However, many software tools that automatically generate electronic messages for organizations do not include abilities to utilize templates including rich content, let alone include integration with content management tools. Further, content management systems are generally limited in function to creation, management, and publication of content, but do not include any functionality to trigger generation of messages based on event occurrences, business data values, or other rules to trigger automated generation and sending of messages.

DETAILED DESCRIPTION

Figure 1:
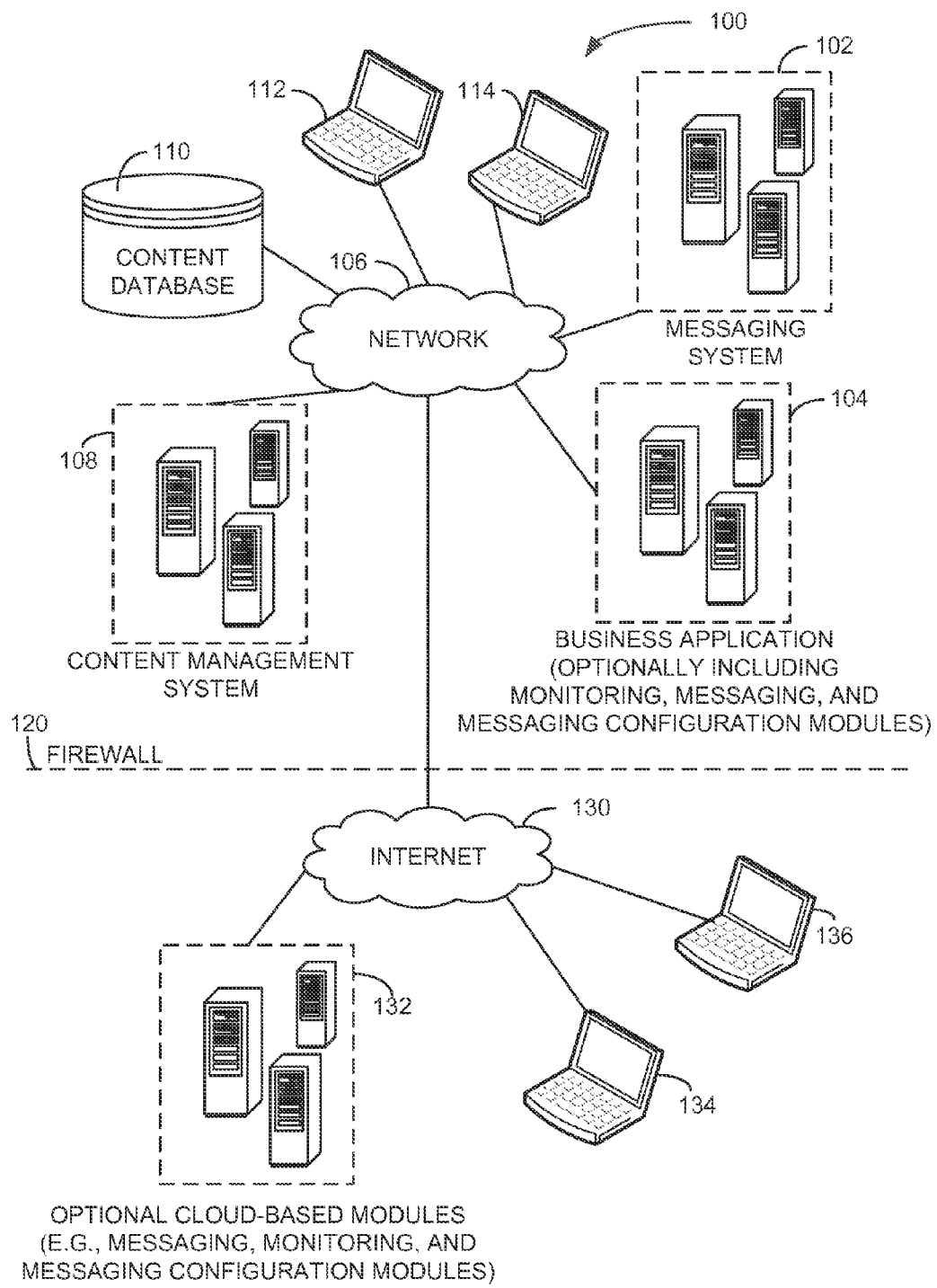
FIG. 1 is an illustration of a computing system, according to an example embodiment.

Rich-content messaging has become popular in recent years, such as emails including formatted text, images, graphics, hyperlinks, and other media. At the same time, organizational control over message content to not only control content of messages, but also the presentation of messages has increase. To affect this control, organizations often utilize content management systems, such as the ADOBE® CQ digital marketing suite of products available from ADOBE SYSTEMS, INC. of San Jose, Calif.

At the same time, organizations often automatically generate electronic messages, such as email, customer specific web pages, Multimedia Messages (MMS), and other messaging types. Such automatically generated messages are typically generated and transmitted by business systems, collaboration systems, and the like. An example of such a system that may automatically generate electronic messages is the ADOBE® CONNECT™ product also available from ADOBE SYSTEMS, INC. of San Jose, Calif. The electronic messages are typically generated based on data maintained or otherwise accessible with these systems in view of rules with regard to the data. Some such rules may be simple scheduling rules, but other rules may be more complex and be based on multiple data items such as a date since last contact in view of an account type. The rules in various embodiments may therefore be of varying complexity based on minimal to a large amount of data values.

Such systems that automatically generate electronic messages are distinct software systems from content management systems. Messages generated by these systems have been significantly limited in their rich-content capabilities and are not synchronized with content elements managed within organizational content management systems. Further, the data of such systems is not accessible by content management systems. Thus, various embodiments illustrated and described herein, as well as other embodiments that will be readily apparent to those skilled in the art, provide integration solutions that leverage content developed and maintained within a content management system to automatically generate and send electronic messages based on data within business system in view of message generation rules. Through such embodiments, organizations are able to automatically generate and send electronic messages from their business systems in rich-content form as facilitated by a content management system of the organization.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an illustration of a computing system 100, according to an example embodiment. The system 100 as illustrated includes is divided into two parts by a firewall 120. On the first side is a network 106, such as a local area network (LAN), which may also include one or more other network types such as a system area network, a wide area network, a virtual private network, and the like. The other side of the firewall 120 is a broader, more generally accessible network such as the Internet 130.

The first side of the firewall 120 includes the network 106. Connected to the network 106 are various other computing devices and systems, such as a content management system 108, a business application 104, a content database 110, and a messaging system 102. The network is also typically connected to the Internet 130. Also connected to the network 106 are client computers 112, 114. Although only two client computer 112, 114 are illustrated, there can be virtually any number of client computers 112, 114 in various embodiments.

The second side of the firewall 120 includes client computers 134, 136 and, in some embodiments, one or more servers 132 that may include cloud-based modules that may provide one or more services with regard to automatic message generation as described below. The client computers 134, 136 may be computing devices of one or both of message recipients and users that access functionality provided by the content management system 108 and business application 104.

The content management system 108 is a content authoring and maintenance program within which message templates are authored and then stored in the content database 110. When authoring message templates, templates are generated with one or more fields that are to be populated with data. The data may be virtually any type of data, but the data to populate the fields will include data from the business application 104 when an electronic message is generated and sent based on the respective message template. The data populated into the fields may also come from other sources, such as the content database 110 and other sources that may be referenced within a message when generated based on a message template, such as by a Universal Resource Locator (URL). Such URL's may also be augmented with additional data, such as a message identifier, an identifier of a message recipient, or other data that may be utilized in retrieving referenced content, tracking a view of a message by a recipient, or other purposes based on the particular embodiment. This additional data will typically be populated based at least in part on data from the business application. Thus, the type of data that may be populated into the templates is generally unrestricted.

Message templates may be generated and stored in various formats, depending on the particular embodiment. For example, the message templates may be in rich-text format, Hypertext Markup Language (HTML) format, an eXtensible Markup Language (XML) format, or other format. One such other format is the iCalendar file format that is utilized to send meeting requests and tasks to uses. The file extension of such file formats is typically ".ics" although other file extensions may be utilized. Other calendar and task formats may also be utilized in various embodiments, such as native, proprietary, and open formats compatible with particular calendaring and groupware applications.

In some embodiments, a message template may be in the form of a calendar invitation from which a groupware system or application can generate a calendar entry, such as for a scheduled, event, meeting, webinar, and such. In such embodiments, the message template fields may include not only an address, but also other fields to be populated with data relevant to the particular event to be scheduled. This may include data with regard to other invitees, a topic of discussion, a description of the event, a date and time of the event, duration of the event, message content, and other such data that may be relevant in the particular embodiment.

In another embodiment, a message template may include one or more attachments. The attachments may be documents, images, audio files, video files, calendar invitations, and other content types. In some embodiments, the attachments may even be templates that will also be populated with data when a message is generated based on the message template to which the attachment is associated.

The business application 104 may be of several application types. In some embodiments, the business application 104 is a customer relationship management application, an application that includes a customer relationship management component, or an application that is integrated with a customer relationship management application. In some embodiments, the business application 104 is a collaboration application, such as may be utilized to conduct webinars, web meetings, collaborations based on documents, or another application-type that is integrated with a collaboration services provided by a collaboration application. Regardless of the specific application-type of the business application 104, the business application automatically generates messages based on one or more of data and events in view of monitored message rules that trigger the automatic generation of messages.

An event-monitoring module is also present within the system 100. The event-monitoring module may be a part of the business application 104, an add-on to the business application 104, a software component that executes on a computing device within the network 106 side of the firewall 120, or a service that executes at least in part on the Internet 130 side of the firewall 120, such as on one or more servers 132 that provide cloud-based data processing services. Regardless of where the event-monitoring module is deployed, the event-monitoring module operates to monitor events and data identified within message rules. When a message rule is triggered, a message generation process is executed based on the triggered rule.

In some embodiments, a message rule is associated with a message template identifier of a message template that has been generated with the content management system 108 and is stored in the content database 110. A message rule is also typically associated with at least one electronic message generation record that includes data associating message template fields with data items of the business application. Thus, when a message rule is triggered based on an event or data condition identified through the monitoring of message rules by the event-monitoring module, the message generation process is triggered which causes retrieval of the message template and the electronic message generation record associated with the triggered message rule. The retrieval of the message template, electronic message generation record, and the data identified within the electronic message generation record, in some embodiments, is performed by the event-monitoring module and provided to the message generation process when it is called. In other embodiments, the message generation process performs such retrievals when called. In some embodiments, the message generation rule and an electronic message generation record may be a single data structure. In other embodiments, a message rule may include a rule that is monitored to trigger message generation according to an associated electronic message generation record that identifies the message template and includes data mappings to the fields of the message template. Further variations may be included in other embodiments.

The message generation process may be a process within the event-monitoring module or may be its own module. The message generation module may therefore be deployed as a part of the business application 104, an add-on to the business application 104, a software component that executes on a computing device within the network 106 side of the firewall 120, or a service that executes at least in part on the Internet 130 side of the firewall 120, such as on one or more servers 132 that provide cloud-based data processing services.

The message generation process, when called, either retrieves or receives the message template, the electronic message generation record, and the data identified within the electronic message generation record. In either case, the message generation process then populates fields of the message template with the received data according to mappings of the data to the message template fields as specified in the electronic message generation record. The message may then be sent or scheduled for sending by the message generation process. The message may be sent as an email, an MMS message, a message via asocial media platform (e.g., FACE-BOOK®) or other mode capable of transporting a rich-content message to an intended recipient. Sending of the message may include sending the message via a messaging system that may be an email server, a process capable of transporting MMS messages, or other system.

Figure 2:
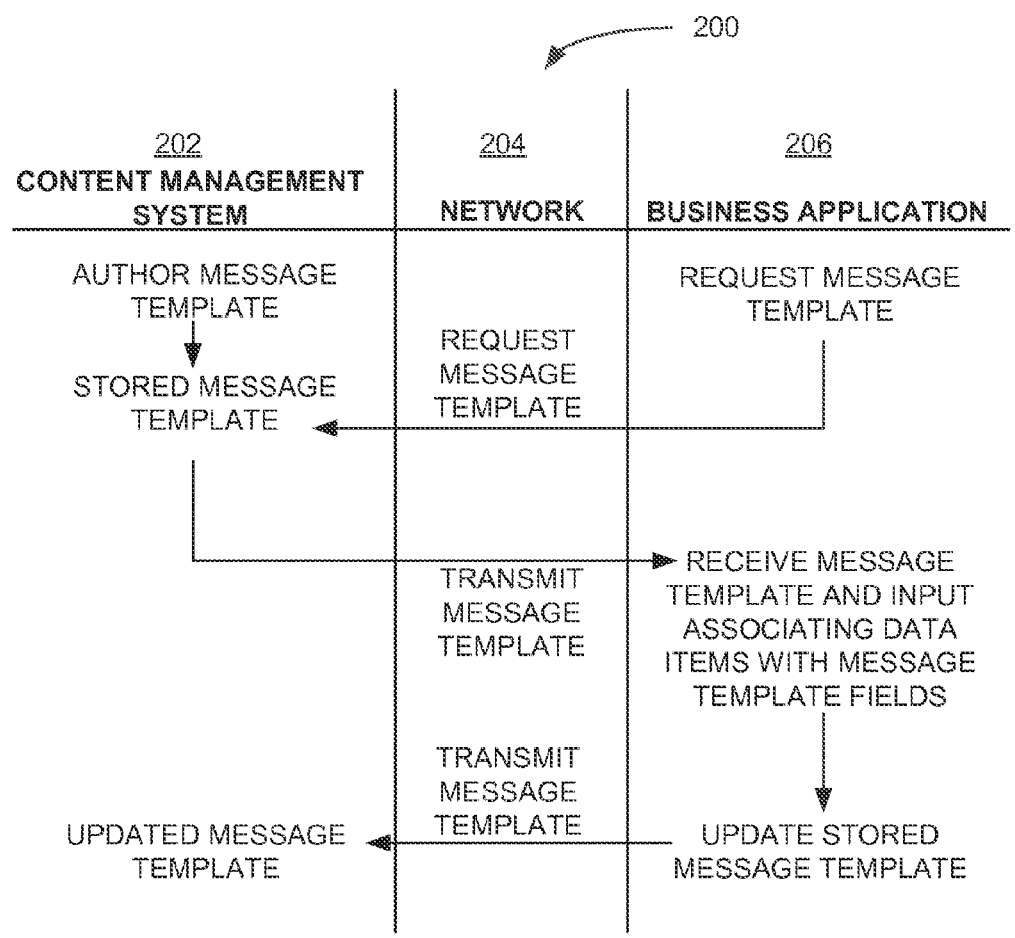
FIG. 2 is a sequential flow diagram of data processing and communication, according to an example embodiment.

FIG. 2 is a sequential flow diagram of data processing and communication, according to an example embodiment. The embodiment FIG. 2 illustrates a process 200 through which a message template is authored and configured for automatic message generation. The process 200 includes a content management system 202, a network 204, and a business application 206. While the content management system 202 and the business application 206 are shown as monolithic applications, the interaction with them may be through client applications, apps that execute on various computing devices (e.g., personal computers, mobile devices, etc.). Some such embodiments may include one or more cloud-based components that interact with content management system 202 and business application 206 over the network 204. Thus, the process 200 illustrated in FIG. 2 is generalized in many regards. The deployment of the process 200 may therefore vary quite broadly between embodiments as should be readily apparent to a person having ordinary skill in the art.

The process 200 begins with the content management system 202. The content management system 202 is utilized to author a message template. A message template is generally a document including rich-content and a set of fields that will be populated with data, at least some of which will come from business application 206 data. The fields include at least an address field that will be populated with an address, such as an email address or mobile telephone number, to which a message generated from the template will be sent. Other fields may include name, account information, images, hyperlinks to account information or other address specific information, customer or account identifiers, and other data. In some embodiments, the fields may include fields for identifier data to be added to URLs of content to be retrieved when a message generated from the template is viewed. For example, a customer identifier may be added to an image URL to facilitate message view tracking.

When the message template authoring has been completed, the message template is stored by the content management system 202. The message template may be stored in a content database, such as content database 110 of FIG. 1. The message template may alternatively be stored on a file server, a web server, or other data storage location from which the message template may be retrieved when needed for further authoring or modification, automated message configuration, or for automated message generation.

The business application 206, or a process associated therewith, may then request the stored message template via the network 204. The content management system 202, storage mechanism, or system storing the stored message template then transmits the message template via the network 204 to the business application 206 or the process associated therewith. The business application then presents at least one user interface to a user, such as a user of one of client computers 112, 114, 134, 136 of FIG. 1, through which message rules may be defined and edited and electronic message generation records can be defined and edited.

An electronic message generation record is a rule that maps data items to fields of a message template. The electronic message generation record, in some embodiments, may also identify a message template to use in generating a message. The mappings of data items to message template fields include at least an address field for population with an address, such as an email address or mobile telephone number, to which a message generated from the message template will be sent. Other fields may include mappings to other data items such name, account information, images, hyperlinks to account information or other address specific information, customer or account identifiers, and other data. In some embodiments, the fields may include data mapped to fields for identifier data to be added to URLs of content to be retrieved when a message generated from the template is viewed. For example, a customer identifier may be added to an image URL to facilitate message view tracking.

An electronic message generation record may include a retrieval argument that may be utilized in retrieving the respective data items. The retrieval argument may be provided by a message by a message rule when the electronic message generation record is invoked. However, retrieval arguments may come from other sources, such as a current date-time value, a data source identified in an electronic message generation record, or other source.

A message rule includes a rule that defines when a message is to be sent and to whom and includes an association to an electronic message generation record. The identity of whom a message is to be sent may identify a specific address of a recipient or may include a rule, a query, or other data defining how message recipients are to be identified. In some embodiments, message rules may also identify a message template to use in generating an electronic message, although and as mentioned above, the message template may alternatively be identified in the associated electronic message generation record.

The rule of a message rule may identify an event or data condition that is monitored. When the monitoring of the rule identifies that the rule is satisfied or violated depending on the particular nature of the rule, generation of a message is triggered. For example, a rule may be defined so that when a user registers for a scheduled event, such as a webinar, the message rule is triggered. The message rule will trigger generation of a message to the registrant. An identifier of the user and an identifier of the associated electronic message generation record may then be provided in a call to an associated message generation process that will then utilize that data to automatically generate a message to the registrant confirming the registration.

In some embodiments, a message rule, when satisfied or violated, may trigger generation of more than one message to one or more recipients. Some such messages may be triggered for sending in the future. For example, returning to the webinar registration example of the preceding paragraph, a registration confirmation may be sent not only to the registrant, but also to an organizer. In such embodiments, the electronic message rule may be associated with a plurality of electronic message generation records. One such electronic message generation record may include a scheduling function that causes the message to be generated and schedules sending of the message at a future time, such as for a certain period before the webinar is to occur.

Returning to the process 200 of FIG. 2, in some embodiments, a user may make modifications to the message template, but such modifications will typically be minor as the editing capabilities of the business application 206 are typically limited. Upon a user completing the definition or modification of one or more of a message rule or electronic message generation record, the data is stored. Any modifications that may have been made to the message template are transmitted via the network 204 to the content management system 202 for storage.

Figure 3:
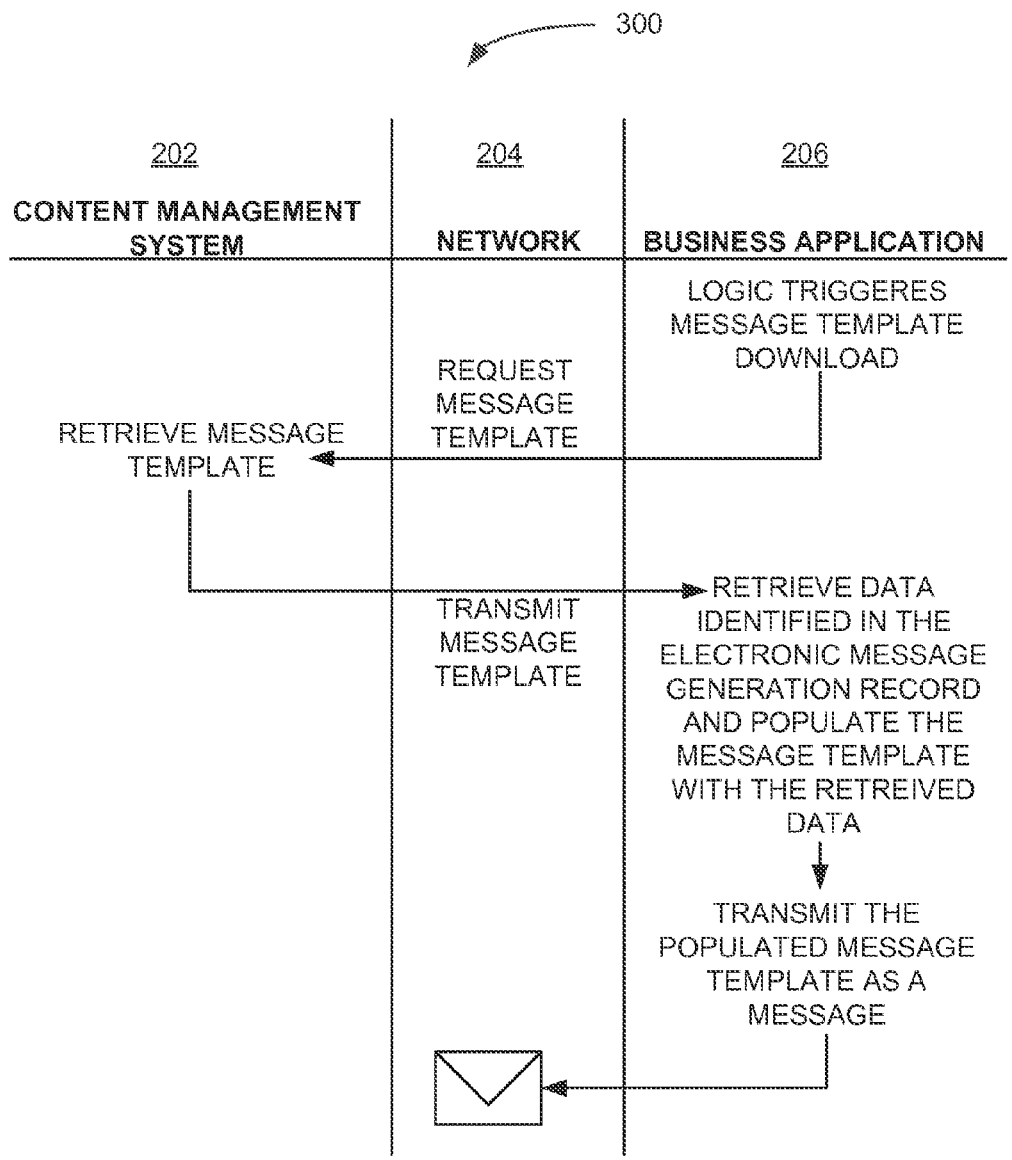
FIG. 3 is a sequential flow diagram of data processing and communication, according to an example embodiment.

FIG. 3 is a sequential flow diagram of data processing and communication, according to an example embodiment. The embodiment FIG. 3 illustrates a process 300 through which a message rule being monitored automatically triggers a message to be generated and sent based on a message template populated with data according to an electronic message generation record. The process 300 includes the content management system 202, the network 204, and the business application 206, as introduced with regard to FIG. 2. As with FIG. 2, the process 300 illustrated in FIG. 3 is generalized in many regards. The deployment of the process 300 may therefore vary quite broadly between embodiments as should be readily apparent to a person having ordinary skill in the art.

The process 300, in some embodiments, includes a monitoring module of the business application 206 identifying an event occurrence or a data condition as defined within a message rule. The monitoring module of the business application 206 then requests a message template, as identified in the message rule or an electronic message generation record associated with the message rule. The request for the message template is sent via the network to 203 the content management system 202 or storage system or device that stores message templates in the particular embodiment. The message template is then transmitted via the network 204 to the business application 206 module.

As noted previously, the monitoring module of the business application 206 may be a process of the business application 206. However, the monitoring module, as well as other processes and modules that perform various functions described herein that are related to automated electronic message generation, may be business application add-on modules, separately executable modules, cloud-based services that operate remotely, either entirely or in part, from the business application 206. Thus, when referring to the business application 206 in this portion of the description and elsewhere, the actual function may be performed outside of, but in cooperation with the business application 206 at least with regard to data.

The business application 206, upon receipt of the message template then retrieves data to populate the message template. The data to retrieve is identified, at least in part, in the electronic message generation record associated with the triggered message rule. The data may be retrieved from the business application 206 or from another system or network location accessible via a local area network, the Internet, or other network. The retrieved data is then populated into the message template. The populated message template is then transmitted via the network 204.

The transmission of the message via the network 204 may include transmitting the message via an email server. However, in some embodiments, a message may be transmitted via other data communication networks or platforms, such as an MMS server, a social media platform such as FACEBOOK® or LinkedIn®, or other network or platform.

Figure 4:
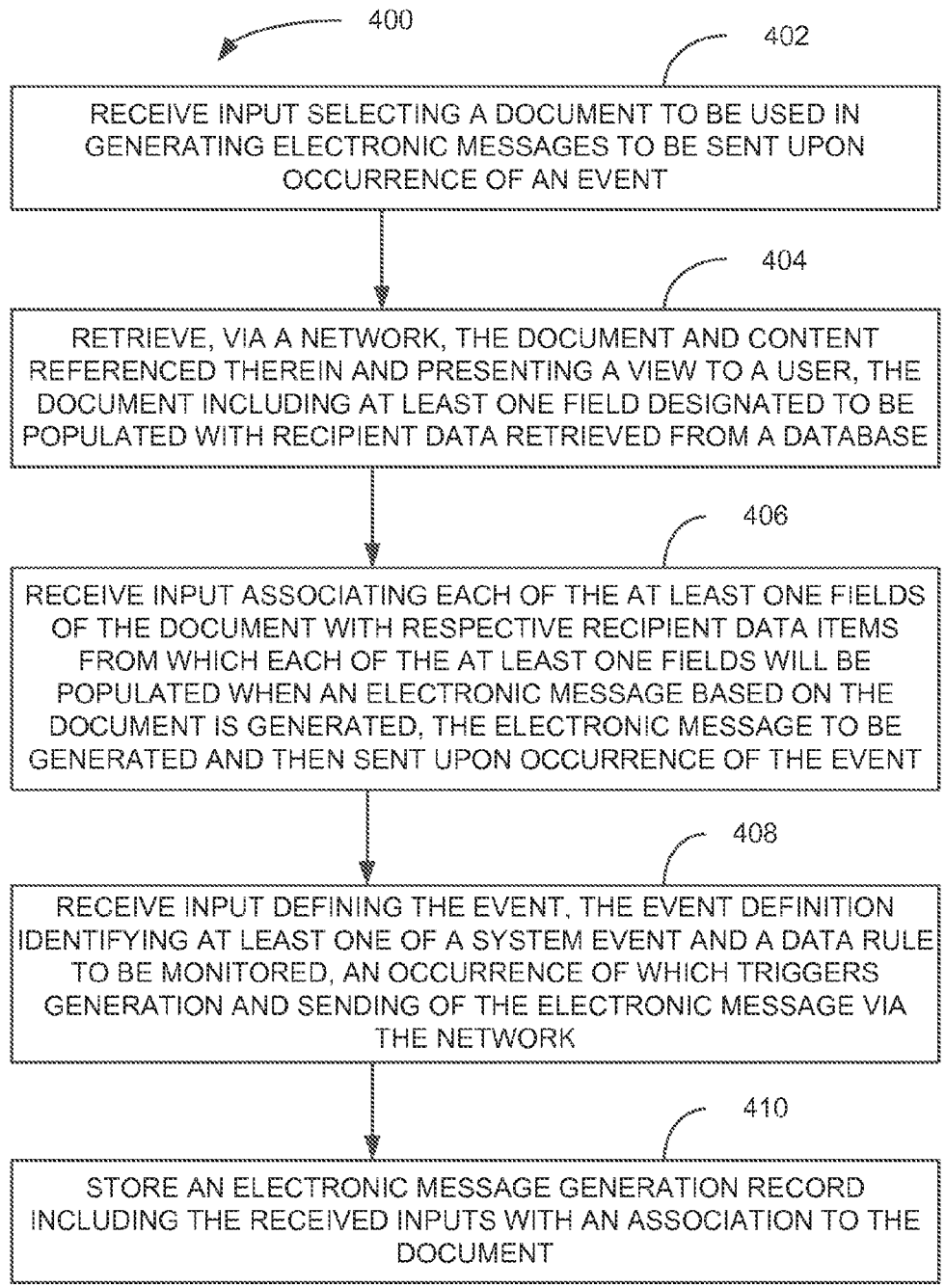
FIG. 4 is a block flow diagram of a method, according to an example embodiment.

FIG. 4 is a block flow diagram of a method 400, according to an example embodiment. The method 400 is an example of method performed to configure a document, such as a document template, for use in automatically generating electronic messages upon occurrence of a defined event or data condition.

The method 400 includes receiving 402 input selecting an HTML document to be used in generating electronic messages to be sent upon occurrence of an event and retrieving 404 the HTML document and content referenced therein and presenting a view to a user. The selected HTML document typically includes at least one field designated to be populated with recipient data retrieved from a database. The method 400 further includes receiving 406 input associating each of the at least one fields of the HTML document with respective recipient data items from which each of the at least one fields will be populated when an electronic message based on the HTML document is generated.

The method 400 additionally includes receiving 408 input defining an event, the occurrence of which will trigger a sending of an electronic message generated based on the HTML document and the received input 406. The received 408 input of the event definition typically identifies at least one of a system event and a data rule to be monitored and an occurrence of which triggers generation and sending of the electronic message. The method 400 further includes storing 410, on a data storage device, an electronic message generation record including the received inputs with an association to the HTML document. In some embodiments, the electronic message generation record is stored in two parts including the electronic message generation record that includes data representative of the field mappings of the HTML document to data items and message rule including data representative of the event definition to be monitored.

In some embodiments of the method 400, receiving 406 the input defining the event includes a data rule to be monitored that identifies scheduling of a collaboration session as represented in data stored in a database. In such embodiments, the HTML document may be a document to be populated with data of a scheduled collaboration session including data identifying a scheduled date and time of the collaboration session and messaging addresses of each recipient to be invited to the participate in the scheduled collaboration session. The HTML document in such embodiments may further include a reference to an artifact to include as an attachment to an electronic message. Such an artifact may be a data item providing a groupware application invitation for the scheduled collaboration session from which a groupware application of a recipient can generate a calendar entry.

Figure 5:
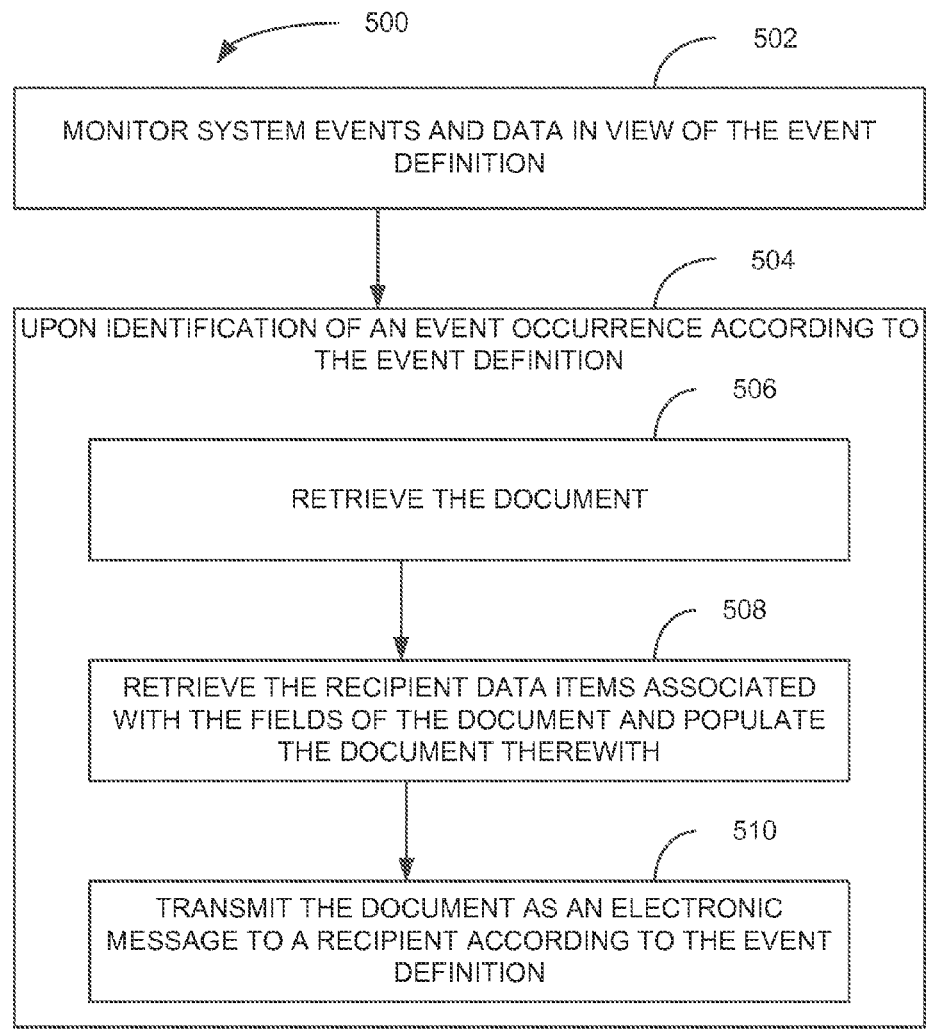
FIG. 5 is a block flow diagram of a method, according to an example embodiment.

Some further embodiments of the method 400 may include receiving and storing input data representing an electronic messaging campaign, such as may be utilized to promote events, products, people, and the like. An electronic messaging campaign may then be associated with a plurality of electronic message generation records and a plurality of system events, dates, and data conditions to trigger sending of messages. For example, a number of messages can be configured to be sent at various times promoting the subject of the campaign, reminding registrants of the subject of the campaign, thanking recipients for their support or patronage, among other messages FIG. 5 is a block flow diagram of a method 500, according to an example embodiment. The method 500 is an example of a method through which generation and sending of an electronic message may be triggered. The method 500 includes monitoring 502 system events and data in view of an event definition. Upon identification 504 of an event occurrence according to the event definition, the method includes retrieving 506 a message template, such as an HTML document as discussed above with regard to the method 400 of FIG. 4. The method 500 further includes retrieving 508 the recipient data items associated with the fields of the HTML document and populating the HTML document therewith. The method 500 may then transmit 510 the populated HTML document as an electronic message to a recipient according to the event definition. In some embodiments, the transmitting 510 of the electronic message may include queue the message for sending at a scheduled time.

Figure 6:
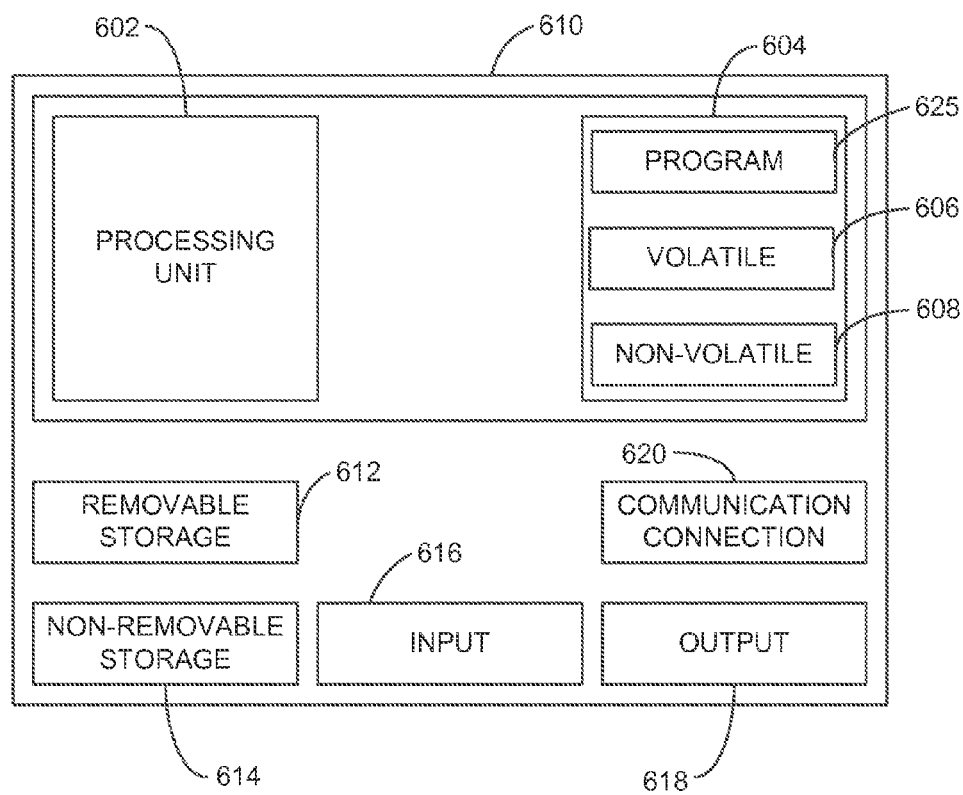
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Memory 604 may include volatile memory 606 and non-volatile memory 608. Computer 610 may include or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a non-transitory computer-readable medium. For example, a computer program 625 capable of performing one or more of the methods illustrated and described herein.

Another embodiment is in the form of a system that includes software that executes on one or more computing devices, such as servers. Such computing devices may be a single computing device, multiple computing devices located within a network of an organization implementing the embodiment, or on at least one computing device that operates remotely from a computing environment operated by an organization implementing the embodiment. Such computing devices may be in the form of the computer 610 of FIG. 6 or other form.

The system in such embodiments includes a collaboration program that performs functions with regard to collaboration sessions conducted utilizing services of the collaboration program. The collaboration program typically includes at least one email module that generates and sends email related to collaboration sessions that are generated from email templates populated with data retrieved from a database.

The system further includes an email configuration module that operates to receive and store input with regard to email to be sent by the email module of the collaboration program. The input received by the email configuration module with regard to an email to be sent may include template input, field input, and event input. The template input identifies a template from a content management program that includes fields to be populated with data retrieved from the database of the collaboration program. The field input links fields of the selected template to data items to be retrieved from the database of the collaboration program. The event input in such embodiments typically includes data defining at least one of a system event and a data rule to be monitored, an occurrence of which triggers generation and sending of the email. For example, the input data defining an event may be a scheduling of a collaboration session or registration by a user for attendance of the collaboration session. Such an event may trigger generation and sending of an invitation or a registration confirmation with regard to the collaboration session. In some such embodiments, receiving the event input includes receiving a selection of a previously defined business.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving input selecting a Hypertext Markup Language (HTML) document to be used in generating electronic messages to be sent upon occurrence of an event;
retrieving, via a network, the HTML document and content referenced therein and presenting a view to a user, the HTML document including at least one field designated to be populated with recipient data retrieved from a database;
receiving input associating each of the at least one fields of the HTML document with respective recipient data items from which each of the at least one fields will be populated when an electronic message based on the HTML document is generated, the electronic message to be generated and then sent upon occurrence of the event;
receiving input defining the event and thereby creating an event definition, the event definition identifying at least one of a system event and a data rule to be monitored, an occurrence of which triggers generation and sending of the electronic message via the network; and
storing, on a data storage device, an electronic message generation record including the received inputs with an association to the HTML document.

2. The method of claim 1, further comprising:
monitoring system events and data in view of the event definition;
upon identification of an event occurrence according to the event definition: retrieving the HTML document;
retrieving the recipient data items associated with the fields of the HTML document and populating the HTML document therewith; and
transmitting the HTML document as an electronic message to a recipient according to the event definition.

3. The method of claim 1, wherein the selected HTML document was authored in a program other than a program performing the method.

4. The method of claim 1, wherein:
the input defining the event includes a data rule to be monitored that identifies scheduling of a collaboration session as represented in data stored in the database;
the HTML document is a document to be populated with data of a scheduled collaboration session including data identifying a scheduled date and time of the collaboration session and messaging addresses of each recipient to be invited to the participate in the scheduled collaboration session.

5. The method of claim 4, wherein the HTML document includes a reference to an artifact to include as an attachment to an electronic message when generated and sent based on the template, the artifact providing a groupware application invitation for the scheduled collaboration session, the groupware application invitation including data from which a groupware application of a recipient generates a calendar entry.

6. The method of claim 1, further comprising:
receiving and storing input data representing an electronic messaging campaign;
associating a plurality of electronic message generation records with the stored data representing the electronic messaging campaign.

7. The method of claim 1, wherein an electronic message generated based on the electronic message generation record is an email message.

8. A system comprising:
at least one processor, at least one memory device, and at least one network interface device;
a collaboration program stored at least in part in the at least one memory device and executable by the at least one processor to perform functions with regard to collaboration sessions conducted utilizing services of the collaboration program, the collaboration program including at least one email module that generates and sends email related to collaboration sessions, the email generated from email templates populated with data retrieved from a database;
an email configuration module stored at least in part in the at least one memory device and executable by the at least one processor to receive and store input with regard to email to be sent by the email module of the collaboration program, the input with regard to an email to be sent including:
template input selecting a template from a content management program, the template including fields to be populated with data retrieved from the database;
field input linking fields of the selected template to data items to be retrieved from the database;
event input defining at least one of a system event and a data rule to be monitored, an occurrence of which triggers generation and sending of the email.

9. The system of claim 8, wherein the generating of the email includes retrieving data from the database according to the field input and populating the template therewith.

10. The system of claim 8, wherein the event input with regard to an email to be sent is a scheduling of a collaboration session.

11. The system of claim 10, wherein the template is an invitation template for the scheduled collaboration session and the template fields include fields to be populated with scheduling information with regard to the scheduled collaboration session and a TO field to be populated with collaboration session invitee email addresses.

12. The system of claim 8, wherein the event input includes a selection of at least one business rule previously defined within the collaboration program.

13. The system of claim 8, wherein the template is a rich-content email template.

14. The system of claim 8, wherein the email configuration module, upon receipt of the template input, retrieves, via the at least one network interface device, the selected template and any additional content referenced therein and presents the template and any retrieved additional content.

15. The system of claim 8, wherein the at least one email module includes an event-monitoring module stored on the at least one memory device and executable by the at least one processor to:
monitor the system and data stored therein or managed thereby in view of stored representations of event input to identify event occurrences;
upon identification of an event occurrence;
retrieving a template associated with the identified event;
retrieving data from the database and populating the retrieved
template with the retrieved data according to field input associated with the identified event and a stored representation of the associated linking input; and
sending at least one email based on the populated retrieved template.

16. The system of claim 15, wherein at least one of the email configuration module and the event-monitoring module is a service hosted on a different computing device at a remote network location.

17. A non-transitory computer-readable storage medium, with instructions stored thereon, which when executed by at least one processor, causes a computer to:
receive input selecting a Hypertext Markup Language (HTML) document to be used in generating electronic messages to be sent upon occurrence of an event;
retrieve, via a network, the HTML document and content referenced therein and present a view to a user, the HTML document including at least one field designated to be populated with recipient data retrieved from a database;
receive input associating each of the at least one fields of the HTML document with respective recipient data items from which each of the at least one fields will be populated when an electronic message based on the HTML document is generated, the electronic message to be generated and then sent upon occurrence of the event;
receive input defining the event, the event definition identifying at least one of a system event and a data rule to be monitored, an occurrence of which triggers generation and sending of the electronic message via the network; and
store, on a data storage device, an electronic message generation record including the received inputs with an association to the HTML document.

18. The computer-readable medium of claim 17, with further instructions stored thereon, which when executed by the at least one processor, causes the computer to:
monitor system events and data in view of the event definition;
upon identification of an event occurrence according to the event definition: retrieve the HTML document;
retrieve the recipient data items associated with the fields of the HTML document and populating the HTML document therewith; and
transmit the HTML document as an electronic message to a recipient according to the event definition.

19. The computer-readable medium of claim 17, wherein:
the input defining the event includes a data rule to be monitored that identifies scheduling of a collaboration session as represented in data stored in the database;
the HTML document is a document to be populated with data of a scheduled collaboration session including data identifying a scheduled date and time of the collaboration session and messaging addresses of each recipient to be invited to the participate in the scheduled collaboration session.

20. The computer-readable medium of claim 17, with further instructions stored thereon, which when executed by the at least one processor, causes the computer to:
receive and store input data representing an electronic messaging campaign; associate a plurality of electronic message generation records with the stored
data representing the electronic messaging campaign.

\* \* \* \* \*